(12) United States Patent
Vella et al.

(10) Patent No.: US 12,521,937 B2
(45) Date of Patent: Jan. 13, 2026

(54) PIEZOELECTRIC COMPOSITE FILAMENTS AND USE THEREOF IN ADDITIVE MANUFACTURING

(71) Applicant: Xerox Corporation, Norwalk, CT (US)

(72) Inventors: Sarah J. Vella, Milton (CA); Yujie Zhu, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/671,733

(22) Filed: Feb. 15, 2022

(65) Prior Publication Data

US 2022/0305719 A1  Sep. 29, 2022

Related U.S. Application Data

(60) Provisional application No. 63/164,679, filed on Mar. 23, 2021.

(51) Int. Cl.
*B29C 64/118* (2017.01)
*B29C 48/05* (2019.01)
(Continued)

(52) U.S. Cl.
CPC ............ *B29C 64/118* (2017.08); *B29C 48/05* (2019.02); *B29C 64/10* (2017.08); *B29C 64/165* (2017.08);
(Continued)

(58) Field of Classification Search
CPC ................ B29C 64/118; B29C 64/314; B33Y 70/00–10; B33Y 40/10
See application file for complete search history.

(56) References Cited

U.S. PATENT DOCUMENTS

2016/0016369 A1* 1/2016 Tarbutton ............. B29C 64/106
264/435
2018/0036939 A1* 2/2018 Sundaresan ............ B33Y 30/00
(Continued)

FOREIGN PATENT DOCUMENTS

WO   WO-2019227082 A1 * 11/2019 ............. B33Y 30/00

OTHER PUBLICATIONS

Van den Ende, Improving the d33 and g33 properties of 0-3 piezoelectric composites by dielectrophoresis, 2010 (accessed May 1, 2024), Journal of Applied Physics 107 (Year: 2010).*
(Continued)

*Primary Examiner* — Andrew L Swanson
(74) *Attorney, Agent, or Firm* — Vorys, Sater, Seymour and Pease LLP

(57) ABSTRACT

Parts made by additive manufacturing are often structural in nature, rather than having functional properties conveyed by a polymer or other component. Printed parts having piezoelectric properties may be formed using a composite filament comprising a plurality of piezoelectric particles dispersed in a thermoplastic polymer. The composite filaments may be formed through melt blending and extrusion. The composite filament is compatible with fused filament fabrication and has a length and diameter compatible with fused filament fabrication, and the piezoelectric particles are substantially non-agglomerated and dispersed along the length of the composite filament. The piezoelectric particles may remain substantially non-agglomerated when dispersed in the thermoplastic polymer through melt blending. Additive manufacturing processes may comprise heating such a composite filament at or above a melting point or softening temperature thereof to form a softened composite material, and depositing the softened composite material layer by layer to form a printed part.

19 Claims, 5 Drawing Sheets

(51) Int. Cl.
| | |
|---|---|
| B29C 64/10 | (2017.01) |
| B29C 64/165 | (2017.01) |
| B29C 64/314 | (2017.01) |
| B33Y 10/00 | (2015.01) |
| B33Y 40/10 | (2020.01) |
| B33Y 70/10 | (2020.01) |
| C08L 23/06 | (2006.01) |
| C08L 25/06 | (2006.01) |
| C08L 53/00 | (2006.01) |
| C08L 53/02 | (2006.01) |
| C08L 67/04 | (2006.01) |
| C08L 71/02 | (2006.01) |
| H10N 30/092 | (2023.01) |
| H10N 30/85 | (2023.01) |
| B29K 23/00 | (2006.01) |
| B29K 25/00 | (2006.01) |
| B29K 33/00 | (2006.01) |
| B29K 67/00 | (2006.01) |
| B29K 101/12 | (2006.01) |
| B29K 105/00 | (2006.01) |
| B29K 105/04 | (2006.01) |
| B29K 105/16 | (2006.01) |
| B29K 505/08 | (2006.01) |
| B29K 507/04 | (2006.01) |
| B29K 509/00 | (2006.01) |
| B29K 509/02 | (2006.01) |
| C08K 3/04 | (2006.01) |
| C08K 3/22 | (2006.01) |
| C08K 7/06 | (2006.01) |
| C08K 9/04 | (2006.01) |

(52) U.S. Cl.
CPC .......... *B29C 64/314* (2017.08); *B33Y 10/00* (2014.12); *B33Y 40/10* (2020.01); *B33Y 70/10* (2020.01); *C08L 23/06* (2013.01); *C08L 25/06* (2013.01); *C08L 53/005* (2013.01); *C08L 53/02* (2013.01); *C08L 67/04* (2013.01); *C08L 71/02* (2013.01); *H10N 30/092* (2023.02); *H10N 30/852* (2023.02); *B29K 2023/18* (2013.01); *B29K 2025/08* (2013.01); *B29K 2033/08* (2013.01); *B29K 2033/12* (2013.01); *B29K 2067/00* (2013.01); *B29K 2067/04* (2013.01); *B29K 2101/12* (2013.01); *B29K 2105/002* (2013.01); *B29K 2105/0023* (2013.01); *B29K 2105/0085* (2013.01); *B29K 2105/0088* (2013.01); *B29K 2105/04* (2013.01); *B29K 2105/16* (2013.01); *B29K 2105/162* (2013.01); *B29K 2505/08* (2013.01); *B29K 2507/04* (2013.01); *B29K 2509/00* (2013.01); *B29K 2509/02* (2013.01); *B29K 2995/0003* (2013.01); *B29K 2995/0005* (2013.01); *B29K 2995/0077* (2013.01); *C08K 3/04* (2013.01); *C08K 2003/2234* (2013.01); *C08K 2003/2237* (2013.01); *C08K 2003/2244* (2013.01); *C08K 7/06* (2013.01); *C08K 9/04* (2013.01); *C08K 2201/001* (2013.01); *C08K 2201/005* (2013.01); *C08K 2201/011* (2013.01); *C08L 2205/025* (2013.01); *C08L 2207/04* (2013.01); *C08L 2207/062* (2013.01)

(56) References Cited

U.S. PATENT DOCUMENTS

| | | | |
|---|---|---|---|
| 2019/0054659 A1* | 2/2019 | Tseng | B33Y 70/10 |
| 2019/0181330 A1* | 6/2019 | Tanabe | C01G 33/006 |
| 2019/0284423 A1* | 9/2019 | Bodkhe | C08K 3/24 |
| 2021/0328130 A1* | 10/2021 | Wang | B33Y 10/00 |
| 2023/0127574 A1* | 4/2023 | Guhathakurta | C08J 3/005 |
| | | | 428/220 |

OTHER PUBLICATIONS

S. Banerjee, An investigation into the influence of electrically conductive particle size on electromechanical coupling and effective dielectric strain coefficients in three phase composite piezoelectric polymers, Composites Part A: Applied Science and Manufacturing, vol. 43, Iss 9, 2012 (Year: 2012).*

Duan S, Wu J, Xia J, Lei W. Innovation Strategy Selection Facilitates High-Performance Flexible Piezoelectric Sensors. Sensors (Basel). May 15, 2020;20(10):2820. doi: 10.3390/s20102820. PMID: 32429255; PMCID: PMC7284718. (Year: 2020).*

Bodkhe S, Turcot G, Gosselin FP, Therriault D. One-Step Solvent Evaporation-Assisted 3D Printing of Piezoelectric PVDF Nanocomposite Structures. ACS Appl Mater Interfaces. Jun. 21, 2017;9(24):20833-20842. doi: 10.1021/acsami.7b04095. Epub Jun. 7, 2017. PMID: 28553704.

Extended European Search Report for corresponding EP Application No. 22160120.6 retrieved Oct. 7, 2022.

* cited by examiner

PIEZOELECTRIC COMPOSITE FILAMENTS AND USE THEREOF IN ADDITIVE MANUFACTURING

FIELD

The present disclosure generally relates to additive manufacturing and, more particularly, additive manufacturing processes utilizing composites and filaments thereof capable of forming printed parts exhibiting piezoelectric properties.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts in any number of complex shapes. Additive manufacturing processes typically operate by building an object layer by layer, for example, by 1) deposition of a stream of molten printing material obtained from a continuous filament or 2) sintering powder particulates of a printing material using a laser. The layer-by-layer deposition usually takes place under control of a computer to deposit the printing material in precise locations based upon a digital three-dimensional "blueprint" of the part to be manufactured, with consolidation of the printing material taking place in conjunction with deposition to form the printed part. The printing material forming the body of a printed part may be referred to as a "build material" herein.

Additive manufacturing processes employing a stream of molten printing material for part formation typically utilize a thermoplastic polymer filament as a source of the molten printing material. Such additive manufacturing processes are sometimes referred to as "fused deposition modeling" or "fused filament fabrication" processes. The latter term is used herein. Additive manufacturing processes employing thermoplastic pellets as a source of printing material are also known.

Additive manufacturing processes employing powder particulates of a printing material oftentimes perform directed heating in selected locations of a particulate bed following printing material deposition to promote coalescence of the powder particulates into a consolidated part. Techniques suitable for promoting consolidation of powder particulates to form a consolidated part include, for example, Powder Bed Fusion (PBF), selective laser sintering (SLS), Electron Beam Melting (EBM), Binder Jetting and Multi-Jet Fusion (MJF).

A wide range of parts having various shapes may be fabricated using both types of additive manufacturing processes. In many instances, build materials employed in both types of additive manufacturing processes may be largely structural in nature, rather than the polymer having an innate functionality itself. One exception is piezoelectric functionality, which may be exhibited in printed objects formed from filaments comprising polyvinylidene fluoride, a polymer which possesses innate piezoelectric properties. Piezoelectric materials generate charge under mechanical strain or, conversely, undergo mechanical strain when a potential is applied thereto. Potential applications for piezoelectric materials include sensing, switching, actuation, and energy harvesting.

Despite the desirability of forming printed parts having piezoelectric properties, there are only limited options for doing so at present. Polyvinylidene fluoride filaments are currently the only commercially available filaments suitable for producing printed parts having piezoelectric properties. While polyvinylidene fluoride can suitably form printed parts in many instances, the range of piezoelectric polymers is otherwise rather limited, and some alternative polymers are not suitable for forming filaments suitable for use in fused filament fabrication. These shortcomings may limit the breadth of conditions to which printed piezoelectric parts may be exposed and the functionality obtainable therefrom may be limited. Moreover, the piezoelectricity of polyvinylidene fluoride is rather low compared to other types of piezoelectric materials. Numerous ceramic materials having high piezoelectricity are available, but they are not printable by themselves and are often very brittle. Moreover, high sintering temperatures (>300° C.) may be needed to promote part consolidation after depositing predominantly a piezoelectric ceramic. Admixtures of polymers and ceramic piezoelectric materials have yet to realize high piezoelectric performance in consolidated parts.

SUMMARY

The present disclosure provides composite filaments suitable for fused filament fabrication. The composite filaments comprise: a thermoplastic polymer and a plurality of piezoelectric particles melt blended with the thermoplastic polymer; wherein the piezoelectric particles are substantially non-agglomerated and are present in a sufficient amount such that the composite filament is capable of being printed as a single-layer thin film having a $d_{33}$ value, after poling, of about 1 pC/N or more at a film thickness of about 200 microns, as measured using an APC International Wide-Range $d_{33}$ meter. Optionally, the piezoelectric particles may be uniformly distributed in the thermoplastic polymer.

In some embodiments, the composite filaments may comprise: a plurality of piezoelectric particles dispersed in a thermoplastic polymer; wherein the composite filaments are compatible with fused filament fabrication and have a length and diameter compatible with fused filament fabrication, and the piezoelectric particles are substantially non-agglomerated and dispersed along the length of the composite filaments.

The present disclosure also provides methods for forming composite filaments suitable for fused filament fabrication. The methods comprise: forming a melt comprising a thermoplastic polymer and a plurality of piezoelectric particles; blending the melt, optionally with stirring, to form a melt blend having the piezoelectric particles distributed therein; and extruding the melt blend to form a composite filament comprising the piezoelectric particles melt blended in a substantially non-agglomerated form with the thermoplastic polymer. Optionally, the piezoelectric particles may be uniformly distributed in the thermoplastic polymer.

In some embodiments, the methods may comprise: forming a melt comprising a thermoplastic polymer and a plurality of piezoelectric particles; blending the melt, optionally with stirring, to form a melt blend having the piezoelectric particles distributed therein; and extruding the melt blend to form a composite filament comprising the plurality of piezoelectric particles dispersed in the thermoplastic polymer, wherein the composite filament is compatible with fused filament fabrication and has a length and diameter compatible with fused filament fabrication, and the piezoelectric particles are substantially non-agglomerated and dispersed along the length of the composite filament; and wherein forming, blending, and extruding occur sequentially or simultaneously.

The present disclosure still further provides additive manufacturing processes for forming printed parts having piezoelectricity. The processes comprise: providing a composite filament comprising a thermoplastic polymer and a plurality of piezoelectric particles melt blended with the thermoplastic polymer; wherein piezoelectric particles are substantially non-agglomerated and are present in a sufficient amount such that the composite filament is capable of being printed as a single-layer thin film having a $d_{33}$ value, after poling, of about 1 pC/N or more at a film thickness of about 200 microns, as measured using an APC International Wide-Range $d_{33}$ meter; heating the composite filament above a softening temperature thereof to form a softened composite material; and depositing the softened composite material layer by layer to form a printed part. Optionally, the piezoelectric particles may be uniformly distributed in the thermoplastic polymer.

In some embodiments, the additive manufacturing processes may comprise: providing a composite filament comprising a plurality of piezoelectric particles dispersed in a thermoplastic polymer; wherein the composite filament is compatible with fused filament fabrication and has a length and diameter compatible with fused filament fabrication, and the piezoelectric particles are substantially non-agglomerated and are dispersed along the length of the composite filament; heating the composite filament at or above a melting point or softening temperature thereof to form a softened composite material; and depositing the softened composite material layer by layer to form a printed part; and wherein heating and depositing occur sequentially or simultaneously.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
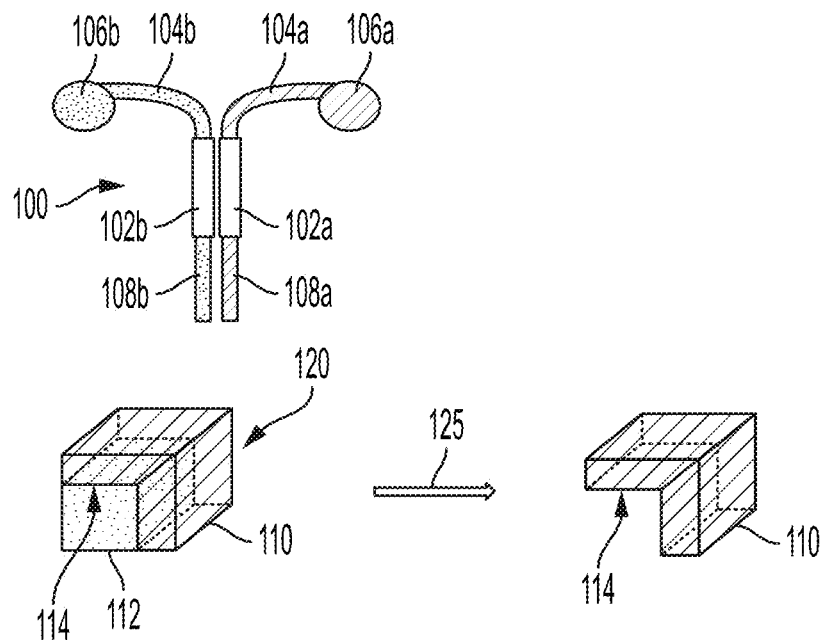
FIG. 1 shows a schematic of an illustrative fused filament fabrication process for producing a part using a build material and a removable support material.

The present disclosure generally relates to additive manufacturing, and more particularly, additive manufacturing processes that may form printed parts having piezoelectric properties. More specifically, the present disclosure provides composite filaments suitable for fused filament fabrication additive manufacturing processes, which are capable of forming parts having piezoelectric properties. Pelletized forms of the composites may also be formed through utilization of melt blending processes disclosed herein.

As discussed above, additive manufacturing processes, such as fused filament fabrication, are powerful tools for generating printed parts in a wide range of complex shapes. In many instances, the polymers used for performing fused filament fabrication are largely structural in nature and do not convey functional properties to a printed part by themselves. Polyvinylidene fluoride is a notable exception, which may convey piezoelectricity to printed parts. While printed parts formed from polyvinylidene fluoride can be useful under a range of conditions, if the intended use conditions for a printed object are outside the range of suitable conditions for this polymer, there are few alternative polymers for introducing piezoelectricity to a printed object. Furthermore, the magnitude of the piezoelectric effect of polyvinylidene fluoride may not be sufficiently large for some intended applications.

In response to the foregoing shortcomings, the present disclosure provides composites and composite filaments obtained through melt blending that are suitable for performing fused filament fabrication and are capable of forming printed parts having significant piezoelectricity, after poling. Composite filaments that are suitable for fused filament fabrication may have diameters that are appropriate for the drive unit for a particular printing system (common filament diameters include 1.75 mm and 2.85 mm) and a length sufficient to facilitate continuous printing for a desired period of time. Other properties that may determine if a composite filament is suitable for fused filament fabrication include the temperature required to extrude the filament, which should not be undesirably high. A suitable filament for fused filament fabrication may minimize printing issues, such as oozing from the print nozzle or clogging of the print nozzle. Suitable materials for inclusion in the composites and composite filaments disclosed herein may form parts that easily separate from a print bed, have sufficient mechanical strength once printed, and exhibit good interlayer adhesion. Composite filaments suitable for fused filament fabrication may be continuous filaments of spoolable length, wherein the term "spoolable length" means sufficiently long to be wound on a spool or reel, and as defined in further detail below. It is to be appreciated that a composite filament of "spoolable length" need not necessarily be spooled, such as when the composite filament is too rigid to be wound onto a spool. Additional characteristics of suitable composite filaments are specified below.

The composite filaments described herein are continuous filaments and comprise piezoelectric particles that are dispersed in a thermoplastic polymer, such as through melt blending. The piezoelectric particles may be dispersed throughout the thermoplastic polymer in a uniform or non-uniform manner, such as a gradient distribution. Suitable melt blending processes may include melt mixing with stirring, followed by extrusion of the resulting melt blend, or direct blending via extrusion with a twin-screw extruder. Surprisingly, such melt blending processes followed by further extrusion to form the composite filaments may afford good distribution of the piezoelectric particles within the composite filaments and printed parts obtained therefrom. Optional cryo-milling, grinding or shredding before further extrusion may further facilitate the extrusion process and promote distribution of the piezoelectric particles within the composite filaments. Moreover, melt blending with little to no void formation in the composite filaments may be realized even in the absence of surfactants and other surface compatibilizers, which otherwise may be detrimental to include in a printed part. Little or no agglomeration of the piezoelectric particles following melt blending may be realized in many instances, which may desirably improve the piezoelectric properties obtained after poling. A uniform distribution of the piezoelectric particles may be realized in some instances. Preferably, the melt blending processes may be conducted without the combination of the thermoplastic polymer and the piezoelectric particles ever being exposed to a solvent together, which may otherwise result in trace organic solvents remaining in the composite filaments following extrusion in some instances. Further advantageously, high loadings of the piezoelectric particles (e.g., inorganic piezoelectric particles, such as ceramics) may be tolerated, while still affording composite filaments and printed parts having high structural integrity and with the piezoelectric particles remaining in a substantially non-agglomerated form following melt blending. Moreover, composites formed through melt blending according to the disclosure herein may remain extrudable as continuous filaments even when the high loadings of piezoelectric particles are present. As such, a higher magnitude of piezoelectricity may be afforded to printed objects (parts) than is achievable with polyvinylidene fluoride alone. Distribution of the piezoelectric particles as individuals rather than as agglomerates may afford a significant increase in the piezoelectric response obtained after poling. Without being bound by theory, the increased piezoelectric response may arise due to improved load transfer between the thermoplastic polymer and the piezoelectric particles, thereby accentuating the voltage obtained upon applying mechanical stress. Further advantageously, a range of thermoplastic polymers may be utilized for forming composite filaments compatible with fused filament fabrication, which may considerably extend the range of suitable use conditions for a printed part.

In the disclosure herein, "filaments" are to be distinguished from "fibers" on the basis that filaments comprise a single elongate composite form, whereas fibers comprise multiple filaments twisted together (bundled) to form a fine thread or wire in which the individual filaments remain identifiable. As such, filaments have smaller diameters than do fiber bundles formed therefrom, assuming no filament compression takes place when forming a fiber bundle. Filaments obtained by solution electrospinning or melt electrospinning are usually up to about 100 μm in diameter, which is too small to be effectively printed using fused filament fabrication. The composite filaments obtained by melt blending and extrusion in the disclosure herein, in contrast, may be about 0.5 mm or more in size and dimensioned for compatibility with a particular printing system for fused filament fabrication.

Although composite filaments may be particularly advantageous when formed according to the disclosure herein, it is to be realized that composite pellets may be produced through similar melt blending processes. Namely, a thermoplastic polymer and piezoelectric particles may be combined with one another under similar melt blending conditions to those employed for forming composite filaments. Instead of extruding to form composite filaments, extrusion may be conducted to provide larger fiber forms, which may then be cut, shredded, pulverized, or the like to afford composite pellets. The morphology of the composite pellets may be similar to that of the composite filaments. Like composite filaments, the composite pellets may be subsequently processed into printed parts having piezoelectric properties under suitable additive manufacturing conditions in certain instances. The composite pellets may similarly retain the piezoelectric particles dispersed substantially as individuals.

Figure 2:
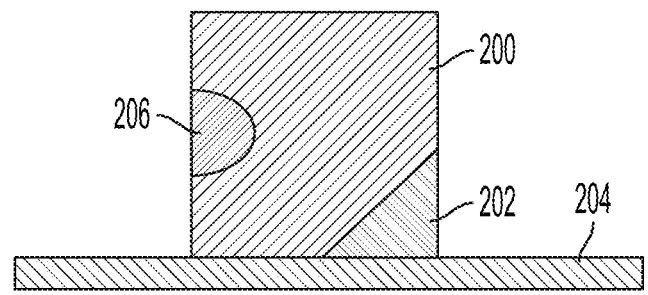
FIG. 2 shows a schematic of an illustrative part having a first removable support interposed between the part and a print bed and a second removable support interposed between two portions of the part.

Before addressing various aspects of the present disclosure in further detail, a brief discussion of additive manufacturing processes, particularly fused filament fabrication processes, parts will first be provided so that the features of the present disclosure can be better understood. FIG. 1 shows a schematic of an illustrative fused filament fabrication process for producing a part using a build material and a removable support material. As shown in FIG. 1, print head 100 includes first extruder 102a and second extruder 102b, which are each configured to receive a filamentous printing material. Specifically, first extruder 102a is configured to receive first filament 104a from first payout reel 106a and provide molten stream 108a of a first printing material, and second extruder 102b is configured to receive second filament 104b from second payout reel 106b and provide molten stream 108b of a second printing material. Both molten streams are initially deposited upon a print bed (not shown in FIG. 1) to promote layer-by-layer growth of supported part 120. The first printing material (build material) supplied by first extruder 102a may be a piezoelectric composite used to fabricate part 110, and the second printing material (removable support material) supplied by second extruder 102b may be a dissolvable or degradable polymer, which is used to fabricate removable support 112 under overhang 114. Overhang 114 is not in direct contact with the print bed or a lower printed layer formed from the build material. In the part arrangement shown in FIG. 1, removable support 112 is interposed between overhang 114 and the print bed, but it is to be appreciated that in alternatively configured parts, removable support 114 may be interposed between two or more portions of part 110. FIG. 2, for example, shows illustrative part 200, in which removable support 202 is interposed between an overhang defined between part 200 and print bed 204, and removable support 206 is interposed between two portions of part 200.

Referring again to FIG. 1, once printing of part 110 and removable support 112 is complete, supported part 120 may be subjected to support removal conditions 125 that result in elimination of removable support 112 (e.g., dissolution or disintegration conditions, or the like) and leave part 110 with overhang 114 unsupported thereon. Support removal conditions 125 may include contact of supported part 120 with a solvent in which removable support 112 is dissolvable or degradable and part 110 is not.

If a printed part is being formed without an overhang or similar feature, it is not necessary to utilize a removable support material during fabrication of the printed part. Similarly, two or more different build materials may be utilized as well, such as when one or more of the build materials is structural in nature and one or more of the build materials is functional in nature. In non-limiting examples, a structural polymer may be concurrently printed with a piezoelectric composite of the present disclosure.

Composite filaments of the present disclosure may comprise a plurality of piezoelectric particles dispersed in a thermoplastic polymer. The composite filaments are compatible with fused filament fabrication and have a length and diameter compatible with fused filament fabrication, and the piezoelectric particles are substantially non-agglomerated and dispersed along the length of the composite filament. The composite filaments may be of spoolable length, as defined further below. In various embodiments, the piezoelectric particles may be no more agglomerated than an extent of particle agglomeration prior to formation of the composite filaments, such as through melt blending. The composite filaments of the present disclosure may afford printed parts having a high degree of piezoelectricity, after poling, in combination with good mechanical properties. The degree of piezoelectricity may be determined by $d_{33}$ values of printed thin films formed from the composite filaments and then poled.

More particularly, the composite filaments of the present disclosure may be capable of being printed as a single-layer thin film having a $d_{33}$ value, after poling, of about 1 pC/N or more at a film thickness of about 200 microns, as measured using an APC International Wide-Range $d_{33}$ meter. Thin film thicknesses are measured using standard techniques separately from the $d_{33}$ measurements. In more particular examples, the composite filaments may be capable of forming single-layer thin films having a $d_{33}$ value, after poling, of about 1 pC/N to about 400 pC/N, or about 2 pC/N to about 200 pC/N, or about 3 pC/N to about 100 pC/N, or about 1 pC/N to about 75 pC/N, or about 5 pC/N to about 50 pC/N, or about 1 pC/N to about 10 pC/N, or about 2 pC/N to about 8 pC/N, or about 3 pC/N to about 10 pC/N, or about 1 pC/N to about 5 pC/N, or about 4 pC/N to about 7 pC/N under these conditions. Piezoelectric charge coefficients other than $d_{33}$ may also be used to characterize the piezoelectricity, such as $d_{31}$ and $d_{15}$, and may differ from the $d_{33}$ values. The loading of piezoelectric particles and suitable melt blending conditions to maintain the piezoelectric particles as individuals once dispersed within the thermoplastic polymer may be selected to afford a desired extent of piezoelectricity, while still maintaining the composite filaments such that they are still compatible with fused filament fabrication. Single-layer film thicknesses that may be printable with the composite filaments may range from about 10 μm to about 500 μm in thickness or about 25 μm to about 400 μm in thickness. Film thicknesses may vary somewhat depending on properties of the polymer comprising the composite filaments, the speed at which printing takes place, the diameter of the print nozzle, and the distance between the print nozzle and the substrate.

The thermoplastic polymer or the piezoelectric particles may constitute a majority component of the composite filaments disclosed herein. More preferably, the piezoelectric particles may comprise at least about 10 vol. %, or at least about 15 vol. %, or at least about 20 vol. %, or at least about 25 vol. % of the composite filaments, based on total filament mass, or at least about 60 vol. %, or at least about 70 vol. %, or at least about 80 vol. %, or at least about 85 vol. %, or at least about 90 vol. %, or at least about 95 vol. %. In more particular examples, the piezoelectric particles may comprise about 10 vol. % to about 85 vol. %, or about 15 vol. % to about 85 vol. %, or about 25 vol. % to about 75 vol. %, or about 40 vol. % to about 60 vol. %, or about 50 vol. % to about 70 vol. % of the composite filament. A maximum volume percentage of the piezoelectric particles may be chosen such that the composite filament maintains structural integrity as a continuous filament and remains printable by fused filament fabrication. Preferably, the piezoelectric particles may be distributed within the thermoplastic polymer under conditions at which the piezoelectric particles remain substantially dispersed as individuals without becoming significantly agglomerated with each other. The piezoelectric particles may be distributed uniformly or non-uniformly within the composite filaments (including gradient distributions wherein the piezoelectric particle loading varies between the outer surface of the composite filaments and a region near a longitudinal axis of the composite filaments, such as an increased piezoelectric particle loading in proximity to the longitudinal axis). Regardless of whether the piezoelectric particles are distributed uniformly or non-uniformly, the piezoelectric particles are dispersed along the length of the composite filament. When dispersed along the length of the composite filament, the composite filaments appear to contain piezoelectric particles in a substantial majority of a plurality of cross-sectional slices definable therein. It is to be appreciated, however, that when viewed at sufficiently high magnification and the cross-sectional slice thickness is sufficiently small, there may be some cross-sectional slices not containing at least one piezoelectric particle. The foregoing still should be considered to constitute an appropriate piezoelectric particle distribution in the disclosure herein.

Composite pellets having piezoelectric properties may feature a similar loading and distribution (dispersion) of piezoelectric particles in a thermoplastic polymer, and when printed as a thin film and poled, they may exhibit a similar range of $d_{33}$ values when measured under the conditions specified above. As in the related composite filaments, the piezoelectric particles may remain in substantially non-agglomerated form when composite pellets are produced through melt blending according to the disclosure herein.

Accordingly, the present disclosure also provides composite pellets comprising: a plurality of piezoelectric particles dispersed in a thermoplastic polymer in an amount such that the piezoelectric particles remain in a substantially non-agglomerated form. More particularly, the composite pellets disclosed herein may be capable of being printed as a single-layer thin film having a $d_{33}$ value, after poling, of about 1 pC/N or more at a film thickness of about 200 microns, as measured using an APC International Wide-Range $d_{33}$ meter.

In order to display observable piezoelectric properties, a material such as a printed part or thin film, may be poled. Poling involves subjecting a material to a very high electric field so that dipoles of a piezoelectric material orient themselves to align in the direction of the applied field. Suitable poling conditions will be familiar to one having ordinary skill in the art. In non-limiting examples, poling may be conducted by corona poling, electrode poling or any combination thereof. In corona poling, a piezoelectric material is subjected to a corona discharge in which charged ions are generated and collect on a surface. An electric field is generated between the charged ions on the surface of a material and a grounded plane on the other side of the material. The grounded plane may be directly adhered to the material or present as a grounded plate. In the electrode poling (contact poling), two electrodes are placed on either side of a piezoelectric material, and the material is subjected to a high electric field generated between the two electrodes. In addition, a sample may be submerged in a high dielectric medium and/or heated to facilitate poling.

Although poling may be conducted as a separate step, as described above, poling may also be conducted in concert with an additive manufacturing process. In non-limiting examples, a high voltage may be applied between an extrusion nozzle supplying molten composite (formed from the composite filaments or composite pellets disclosed herein) and a grounded plane onto which the molten composite is being deposited to form a printed part.

Suitable piezoelectric particles for use in the present disclosure are not believed to be particularly limited, provided that the piezoelectric particles may be adequately dispersed in the thermoplastic polymer (e.g., through melt blending), remain substantially non-agglomerated once dispersed, and produce a piezoelectric effect that is sufficiently high when present in a suitable amount. The piezoelectric particles may be blended with the thermoplastic polymer substantially as individual particles (non-agglomerated) and need not necessarily be covalently bonded to the thermoplastic polymer to achieve a satisfactory extent of dispersion through blending. The amount of piezoelectric particles dispersed within the thermoplastic polymer and the melt blending conditions used to produce the composite filaments may be such that the piezoelectric particles are no more agglomerated than before they were introduced to the thermoplastic polymer. Illustrative examples of piezoelectric materials that may be present in piezoelectric particles suitable for use herein include, but are not limited to, crystalline and non-crystalline ceramics, and naturally occurring piezoelectric materials. Suitable crystalline ceramics exhibiting piezoelectric properties may include, but are not limited to, lead zirconate titanate (PZT), potassium niobate, sodium tungstate, $Ba_2NaNNb_5O_5$, and $Pb_2KNb_5O_{15}$. Suitable non-crystalline ceramics exhibiting piezoelectric properties may include, but are not limited to, sodium potassium niobate, bismuth ferrite, sodium niobate, barium titanate, bismuth titanate, and sodium bismuth titanate. Particularly suitable examples of piezoelectric particles for use in the disclosure herein may include those containing, for instance, lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof. Suitable dopants for lead zironate titanate may include, but are not limited to Ni, Bi, La, and Nd.

Other suitable piezoelectric particles may include naturally occurring piezoelectric materials such as, for example, quartz crystals, cane sugar, Rochelle salt, topaz, tourmaline, bone, or any combination thereof.

The piezoelectric particles employed in the disclosure herein may have an average particle size in a micrometer or nanometer size range. In more particular examples, suitable piezeoelectric particles may have a diameter of about 25 microns or less, or about 10 microns or less, such as about 1 micron to about 10 microns, or about 2 microns to about 8 microns. Smaller piezoelectric particles, such as those having an average particle size under 100 nm or an average particle size of about 100 nm to about 500 nm or about 500 nm to about 1 micron may also be utilized in the disclosure herein. Average particle sizes in the disclosure herein represent $D_{50}$ values, which refer to a diameter at which 50% of the sample (on a volume basis unless otherwise specified) is comprised of particles having a diameter less than said diameter. $D_{50}$ may also be referred to as the "average particle size." Such average particle size measurements may be made by analysis of optical images, including via SEM analysis, or using onboard software of a Malvern Mastersizer 3000 Aero S instrument, which uses light scattering techniques for particle size measurement.

Agglomeration refers to an assembly comprising a plurality of particulates that are loosely held together through physical bonding forces. Agglomerates may be broken apart through input of energy, such as through applying ultrasonic energy, to break the physical bonds. Individual piezoelectric particles that have been produced through de-agglomeration may remain de-agglomerated once melt blending with a thermoplastic polymer has taken place. That is, defined agglomerates are not believed to re-form to a substantial degree (e.g., <10% agglomeration, or <5% agglomeration, or <1% agglomeration) during formation of the composite filaments, composite pellets, and/or the melt blending processes disclosed herein. It is to be appreciated that two or more piezoelectric particles may be in contact with one another in a piezoelectric composite produced by melt blending, but the extent of interaction is less than that occurring in an agglomerate of piezoelectric particulates. In non-limiting examples, agglomerates of piezoelectric particles may have a size ranging from about 100 microns to about 200 microns, and individual piezoelectric particles obtained after de-agglomeration may be in a size range of about 1 micron to about 5 microns or about 1 micron to about 10 microns. Other de-agglomerated piezoelectric particle sizes are provided above. The de-agglomerated piezoelectric particle sizes may be maintained following formation of a piezoelectric composite of the present disclosure.

Thermoplastic polymers suitable for use in the disclosure herein are not considered to be particularly limited, provided that the piezoelectric particles may dispersed therein (e.g., through melt blending) in an effective distribution and amount such that the thermoplastic polymer is capable of being processed by fused filament fabrication or alternative additive manufacturing process to form a printed part having a desired extent of piezoelectricity. Melt blending processes may maintain the piezoelectric particles in a de-agglomerated form after formation of the composite filaments or composite pellets. Suitable thermoplastic polymers may additionally exhibit a softening temperature or melting point sufficient to facilitate deposition at a temperature ranging from about 50° C. to about 400° C., or about 70° C. to about 275° C., or from about 100° C. to about 200° C., or from about 175° C. to about 250° C. Melting points may be determined using ASTM E794-06 (2018) with a 10° C. ramping and cooling rate, and softening temperatures may be determined using ASTM D6090-17.

Illustrative examples of suitable thermoplastic polymers may include those commonly employed in fused filament fabrication such as, for instance, a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene (HIPS), polystyrene, a thermoplastic polyurethane, a poly(acrylonitrile-butadiene-styrene) (ABS), a polymethylmethacrylate, a poly(vinylpyrrolidine-vinylacetate), a polyester (e.g., polyethylene terephthalate, polyethylene naphthalate, polyethylene terephthalate glycol, and the like), a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof. Other suitable thermoplastic polymers that may be present in the composite filaments include, for example, polylactic acid, polyvinylpyrrolidone-co-polyvinyl acetate (PVP-co-PVA), and the like. Polyamides may be particularly suitable non-piezoelectric thermoplastic polymers for forming melt blends containing piezoelectric particles according to the disclosure herein. Some examples of the composite filaments disclosed herein may include a suitable thermoplastic polymer that is itself non-piezoelectric. In particular examples, some composite filaments may comprise a thermoplastic polymer other than polyvinylidene fluoride. Preferably, the composite filaments of the present disclosure may be substantially free of thermosetting or other crosslinked polymers, including uv-curable resins and similar resins capable of forming thermosetting or other crosslinked polymers.

In fused filament fabrication processes utilizing the composite filaments disclosed herein, the print head may contain one or more extruders, such that a first polymer filament comprising a build material is deposited from a first extruder. The build material may comprise a composite filament in accordance with the disclosure above. Optionally, a second polymer filament comprising a removable support material may be deposited from a second extruder to form a removable support for defining one or more overhangs in a printed part formed from the build material. Filaments (composite filaments or non-composite filaments) suitable for use in the foregoing manner, particularly within fused filament fabrication, may range from about 0.5 mm to about 10 mm in diameter, or about 1 mm to about 5 mm in diameter, particularly about 1.5 mm to about 3.5 mm in diameter. Standard filament diameters for many three-dimensional printers employing fused filament fabrication technology are 1.75 mm or 2.85 mm (about 3.0 mm). It is to be recognized that any suitable filament diameter may be used in accordance with the disclosure herein, provided that the filament is compatible with a user's particular printing system. Similarly, the length and/or color of the filaments is/are not believed to be particularly limited in the processes disclosed herein. Preferably, the melt blended composite filaments disclosed herein are continuous and have elongate lengths, such as at least about 1 foot, or at least about 5 feet, or at least about 10 feet, or at least about 25 feet, or at least about 50 feet, or at least about 100 feet, or at least about 250 feet, or at least about 500 feet, or at least about 1000 feet, any of which may be considered spoolable lengths, even if a given composite filament is not necessarily spooled. Composite filaments of spoolable length may further be substantially uniform in diameter as well.

Accordingly, composite filaments produced according to the disclosure herein may have a diameter compatible for use in fused filament fabrication additive manufacturing processes. Particularly suitable examples may include composite filament diameters ranging from about 1 mm to about 10 mm, wherein the composite filaments are of a length greater than about 1 foot or even longer. Various filament processing conditions may be utilized to adjust the filament diameter, as explained hereinafter.

Particularly suitable processes for forming composite filaments compatible with fused filament fabrication may take place through melt blending, which may include melt mixing with stirring, followed by extrusion, or direct extrusion with a twin-screw extruder. More specific melt blending processes may comprise combining a thermoplastic polymer and a plurality of piezoelectric particles, forming a melt comprising the thermoplastic polymer and the piezoelectric particles, blending the melt, optionally with stirring, to form a melt blend comprising the piezoelectric particles distributed therein, and extruding the melt blend to form a composite filament comprising the piezoelectric particles melt blended in a substantially non-agglomerated form with the thermoplastic polymer. The piezoelectric particles may be dispersed in the thermoplastic polymer, and the composite filament is compatible with fused filament fabrication and has a length and diameter compatible with fused filament fabrication. The piezoelectric particles are substantially non-agglomerated and dispersed along the length of the composite filament. Forming, blending, and extruding in the foregoing may occur sequentially or simultaneously. Any of the foregoing piezoelectric particles and thermoplastic polymers may be processed in this manner to afford a composite filament capable of being printed as a single-layer thin film having a $d_{33}$ value, after poling, of about 1 pC/N or more at a film thickness of about 200 microns, as measured using an APC International Wide-Range $d_{33}$ meter, when the piezoelectric particles are present in a sufficient amount.

Composite pellets of the present disclosure may be formed in a similar manner, but without extruding directly into a filament form. Instead, the composite may be extruded into a larger diameter fiber that may be cut, shredded, pulverized, ground, or the like to afford composite pellets having a similar morphology to the composite filaments.

In further embodiments, the melt blend may optionally be additionally processed before extruding takes place (e.g., in instances where melt blending takes place prior to extrusion). In particular, the melt blend may be cooled and solidified (e.g., below the melting point or softening temperature of the thermoplastic polymer), and cryogenically milling the melt blend after solidifying and prior to extruding the melt blend. Cryogenic milling will be familiar to one having ordinary skill in the art and may be conducted to reduce the particle size of the melt blend with lower risk of localized heating of the thermoplastic polymer and/or the piezoelectric particles taking place and promoting degradation thereof. Although cryogenic milling may be advantageous, it is to be appreciated that non-cryogenic milling may also be conducted, or the melt blend may be extruded directly without being cooled and solidified first in alternative process variations. Shredding or grinding of the melt blend may also be conducted prior to extrusion as an alternative process variation. In some instances, melt blended piezoelectric pellets may be obtained without proceeding through a secondary extrusion process.

In some or other particular embodiments, piezoelectric particles employed to form the melt blends may be obtained by probe sonication, specifically probe sonication of larger piezoelectric particles or agglomerates thereof that are decreased to a suitable particle size and non-agglomerated form through input on sonic energy. In more specific examples, PZT particles or similar piezoelectric particles processed by probe sonication may have an average particle size of about 10 microns or less, such as a particle size ranging from about 1 micron to about 5 microns, or about 1 micron to about 2 microns. These piezoelectric particle sizes may be maintained in the composite filaments or composite pellets produced by melt blending, and the piezoelectric particles may remain in substantially non-agglomerated form in the composite filaments and composite pellets disclosed herein.

Additive manufacturing processes taking place by fused filament fabrication according to the present disclosure may comprise providing a composite filament described herein, heating the composite filament at or above a melting point or a softening temperature thereof to form a softened composite material, and depositing the softened composite material layer by layer to form a printed part. The composite filament may be deposited layer by layer by itself or in combination with a suitable removable support material also deposited from a continuous filament to form a printed part having piezoelectric properties (after suitable poling). Suitable types of parts having piezoelectric properties are not considered to be particularly limited in the present disclosure. Such methods may further comprise poling at least a portion of the printed part to initiate or enhance the piezoelectric properties.

Embodiments disclosed herein include:

A. Melt blended composite filaments compatible with fused filament fabrication. The melt blended composite filaments comprise: a thermoplastic polymer and a plurality of piezoelectric particles melt blended with the thermoplastic polymer; wherein the piezoelectric particles are substantially non-agglomerated and are present in a sufficient amount such that the melt blended composite filament is capable of being printed as a single-layer thin film having a $d_{33}$ value, after poling, of about 1 pC/N or more at a film thickness of about 200 microns, as measured using an APC International Wide-Range $d_{33}$ meter.

B. Methods for making melt blended composite filaments compatible with fused filament fabrication. The methods comprise: forming a melt comprising a thermoplastic polymer and a plurality of piezoelectric particles; blending the melt, optionally with stirring, to form a melt blend having the piezoelectric particles distributed therein; and extruding the melt blend to form a melt blended composite filament comprising the piezoelectric particles melt blended in a substantially non-agglomerated form with the thermoplastic polymer.

C. Methods for conducting fused filament fabrication with melt blended composite filaments. The methods comprise: providing a melt blended composite filament comprising a thermoplastic polymer and a plurality of piezoelectric particles melt blended with the thermoplastic polymer; wherein the piezoelectric particles are substantially non-agglomerated and are present in a sufficient amount such that the melt blended composite filament is capable of being printed as a single-layer thin film having a $d_{33}$ value, after poling, of about 1 pC/N or more at a film thickness of about 200 microns, as measured using an APC International Wide-Range $d_{33}$ meter; heating the melt blended composite filament above a softening temperature thereof to form a softened composite material; and depositing the softened composite material layer by layer to form a printed part. Optionally, at least a portion of the printed part may be poled.

D. Melt blended composite pellets. The melt blended composite pellets comprise: a thermoplastic polymer and a plurality of piezoelectric particles melt blended with the thermoplastic polymer and shaped to define a pelletized form; wherein the piezoelectric particles are substantially non-agglomerated and are present in a sufficient amount such that the melt blended composite pellet is capable of being printed as a single-layer thin film having a $d_{33}$ value, after poling, of about 1 pC/N or more at a film thickness of about 200 microns, as measured using an APC International Wide-Range $d_{33}$ meter.

Each of embodiments A-C and D may have one or more of the following additional elements in any combination:

Element 1: wherein the piezoelectric particles have an average particle size of about 10 microns or less.

Element 2: wherein the piezoelectric particles comprise about 25 vol. % to about 70 vol. % of the composite filament.

Element 3: wherein the melt blended composite filament is substantially free of voids.

Element 4: wherein the melt blended composite filament is substantially free of compatibilizers and/or solvents.

Element 5: wherein the melt blended composite filament has a diameter ranging from about 1 mm to about 10 mm.

Element 6: wherein the thermoplastic polymer comprises a polymer selected from the group consisting of a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene, a polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Element 7: wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, gallium phosphate, quartz, tourmaline and any combination thereof.

Element 8: wherein the composite filament is capable of being printed as a single-layer thin film having a thickness ranging from about 10 microns to about 500 microns.

Element 9: wherein the composite filament is capable of being printed as a single-layer thin film having a $d_{33}$ value, after poling, of about 1 pC/N or more at a single-layer film thickness of about 200 microns, as measured using an APC International Wide-Range $d_{33}$ meter.

Element 10: wherein the piezoelectric particles are processed by probe sonication before being combined with the thermoplastic polymer.

Element 11: wherein the method further comprises cooling and solidifying the uniform melt blend; and cryogenic milling the uniform melt blend or shredding the uniform melt blend after solidifying and prior to extruding the uniform melt blend.

Element 12: wherein at least a portion of the printed part is poled.

By way of non-limiting example, exemplary combinations applicable to A-C and D include, but are not limited to: 1 and 2; 1, and 3 and/or 4; 1 and 5; 1 and 6; 1, 6 and 7; 1 and 8; 1 and 10; 2, and 3 and/or 4; 2 and 5; 2 and 6; 2, 6 and 7; 2 and 8; 2 and 10; 3 and/or 4, and 5; 3 and/or 4, and 6; 3 and/or 4, and 7; 3 and/or 4, and 6 and 7; 3 and/or 4, and 8; 3 and/or 4, and 10; 5 and 6; 5 and 7, 5-7; 5 and 8; 5 and 10; 6 and 7; 6 and 8; 6 and 10; 7 and 8; 7 and 10; and 8 and 10. Any of the foregoing may be present in further combination with 12. With respect to B, and of 1-8 and 10 may be in further combination with 9, 11 or 9 and 11, or 9 and 11 may be present in combination with one another without 1-8 and 10.

Additional embodiments disclosed herein include:

A'. Composite filaments. The composite filaments comprise: a plurality of piezoelectric particles dispersed in a thermoplastic polymer; wherein the composite filament is compatible with fused filament fabrication and has a length and diameter compatible with fused filament fabrication, and the piezoelectric particles are substantially non-agglomerated and dispersed along the length of the composite filament.

B'. Processes for making composite filaments. The processes comprise: forming a melt comprising a thermoplastic polymer and a plurality of piezoelectric particles; blending the melt, optionally with stirring, to form a melt blend having the piezoelectric particles distributed therein; and extruding the melt blend to form a composite filament comprising the plurality of piezoelectric particles dispersed in the thermoplastic polymer, wherein the composite filament is compatible with fused filament fabrication and has a length and diameter compatible with fused filament fabrication, and the piezoelectric particles are substantially non-agglomerated and dispersed along the length of the composite filament; and optionally wherein forming, blending, and extruding occur sequentially or simultaneously.

C'. Additive manufacturing processes. The additive manufacturing processes comprise: providing a composite filament comprising a plurality of piezoelectric particles dispersed in a thermoplastic polymer; wherein the composite filament is compatible with fused filament fabrication and has a length and diameter compatible with fused filament fabrication, and the piezoelectric particles are substantially non-agglomerated and are dispersed along the length of the composite filament; heating the composite filament at or above a melting point or softening temperature thereof to form a softened composite material; and depositing the softened composite material layer by layer to form a printed part; and wherein heating and depositing occur sequentially or simultaneously.

Element 1': wherein the piezoelectric particles are present in a sufficient amount such that the composite filament is capable of being printed as a single-layer thin film having a $d_{33}$ value, after poling, of about 1 pC/N or more at a film thickness of about 200 microns, as measured using an APC International Wide-Range $d_{33}$ meter.

Element 2': wherein the piezoelectric particles have an average particle size of about 10 microns or less.

Element 3': wherein the piezoelectric particles comprise about 10 vol. % to about 85 vol. % of the composite filament.

Element 4': wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

Element 5': wherein the thermoplastic polymer comprises a polymer selected from the group consisting of a polyamide, a polycaprolactone, a polylactic acid, a polystyrene, a poly(styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Element 6': wherein the composite filament is of spoolable length and/or wherein the piezoelectric particles are processed by probe sonication before being combined with the thermoplastic polymer.

Element 7': wherein the process further comprises poling at least a portion of the printed part.

By way of non-limiting example, exemplary combinations applicable to A', B', and C' include, but are not limited to: 1' and 2'; 1' and 3'; 1'-3'; 1' and 4'; 1', 2', and 4'; 1', 3', and 4'; 1' and 5'; 1' and 6'; 2' and 3'; 2'-4'; 2', 3', and 5'; 2' and 6'; 3' and 4'; 3' and 5'; 3'-5'; 4' and 5', and 4' and 6'. 7 may be in further combination with any of the foregoing.

CLAUSES OF THE DISCLOSURE

Clause 1: A melt blended composite filament compatible with fused filament fabrication, comprising:
a thermoplastic polymer and a plurality of piezoelectric particles melt blended with the thermoplastic polymer;
wherein the piezoelectric particles are substantially non-agglomerated and are present in a sufficient amount such that the melt blended composite filament is capable of being printed as a single-layer thin film having a $d_{33}$ value, after poling, of about 1 pC/N or more at a film thickness of about 200 microns, as measured using an APC International Wide-Range $d_{33}$ meter.

Clause 2: The composite filament of clause 1, wherein the piezoelectric particles have an average particle size of about 10 microns or less.

Clause 3: The composite filament of clause 1, wherein the piezoelectric particles comprise about 25 vol. % to about 70 vol. % of the composite filament.

Clause 4: The composite filament of clause 1, wherein the thermoplastic polymer comprises a polymer selected from the group consisting of a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene, a polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Clause 5: The composite filament of clause 1, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

Clause 6: The composite filament of clause 1, wherein the composite filament is capable of being printed as a single-layer thin film having a thickness ranging from about 10 microns to about 500 microns.

Clause 7: A method for forming a melt blended composite filament compatible with fused filament fabrication, the method comprising:
forming a melt comprising a thermoplastic polymer and a plurality of piezoelectric particles;
blending the melt, optionally with stirring, to form a melt blend having the piezoelectric particles distributed therein; and
extruding the melt blend to form a melt blended composite filament comprising the piezoelectric particles melt blended in a substantially non-agglomerated form with the thermoplastic polymer.

Clause 8: The method of clause 7, wherein the piezoelectric particles are present in a sufficient amount such that the melt blended composite filament is capable of being printed as a single-layer thin film having a $d_{33}$ value, after poling, of about 1 pC/N or more at a single-layer film thickness of about 200 microns, as measured using an APC International Wide-Range $d_{33}$ meter.

Clause 9: The method of clause 7, wherein the piezoelectric particles are processed by probe sonication before being combined with the thermoplastic polymer.

Clause 10: The method of clause 7, wherein the piezoelectric particles have an average particle size of about 10 microns or less.

Clause 11: The method of clause 7, further comprising:
cooling and solidifying the melt blend; and
cryogenic milling the melt blend or shredding the melt blend after solidifying and prior to extruding the melt blend.

Clause 12: The method of clause 7, wherein the piezoelectric particles comprise about 25 vol. % to about 70 vol. % of the melt blended composite filament.

Clause 13: The method of clause 7, wherein the thermoplastic polymer comprises a polymer selected from the group consisting of a polyamide, a polycaprolactone, a polylactic acid, a polystyrene, a poly(styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Clause 14: The method of clause 7, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

Clause 15: The method of clause 7, wherein the composite filament is capable of being printed as a single-layer thin film having a thickness ranging from about 10 microns to about 500 microns.

Clause 16: An additive manufacturing process comprising:
providing a melt blended composite filament comprising a thermoplastic polymer and a plurality of piezoelectric particles melt blended with the thermoplastic polymer;
wherein the piezoelectric particles are substantially non-agglomerated and are present in a sufficient amount such that the melt blended composite filament is capable of being printed as a single-layer thin film having a $d_{33}$ value, after poling, of about 1 pC/N or more at a film thickness of about 200 microns, as measured using an APC International Wide-Range $d_{33}$ meter;
heating the melt blended composite filament above a softening temperature thereof to form a softened composite material; and
depositing the softened composite material layer by layer to form a printed part.

Clause 17: The additive manufacturing process of clause 16, wherein the piezoelectric particles have an average particle size of about 10 microns or less.

Clause 18: The additive manufacturing process of clause 16, wherein the piezoelectric particles comprise about 10 vol. % to about 85 vol. % of the melt blended composite filament.

Clause 19: The additive manufacturing process of clause 16, wherein the thermoplastic polymer comprises a polymer selected from the group consisting of a polyamide, a polycaprolactone, a polylactic acid, a polystyrene, a poly(styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Clause 20: The additive manufacturing process of clause 16, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

Clause 21: The additive manufacturing process of clause 16, further comprising: poling at least a portion of the printed part.

Clause 22: Melt blended composite pellets, comprising:
a thermoplastic polymer and a plurality of piezoelectric particles melt blended with the thermoplastic polymer;
wherein the piezoelectric particles are substantially non-agglomerated and are present in a sufficient amount such that the melt blended composite pellets are capable of being printed as a single-layer thin film having a $d_{33}$ value, after poling, of about 1 pC/N or more at a film thickness of about 200 microns, as measured using an APC International Wide-Range $d_{33}$ meter.

Clause 23: Melt blended composite pellets, comprising:
a thermoplastic polymer and a plurality of piezoelectric particles melt blended with the thermoplastic polymer;
wherein the piezoelectric particles are substantially non-agglomerated.

Clause 24: A melt blended composite filament compatible with fused filament fabrication, comprising:
a thermoplastic polymer and a plurality of piezoelectric particles melt blended with the thermoplastic polymer;
wherein the piezoelectric particles are substantially non-agglomerated.

Clause 25: The composite filament of clause 24, wherein the piezoelectric particles have an average particle size of about 10 microns or less.

Clause 26: The composite filament of clause 24, wherein the piezoelectric particles comprise about 10 vol. % to about 85 vol. % of the composite filament.

Clause 27: The composite filament of clause 24, wherein the thermoplastic polymer comprises a polymer selected from the group consisting of a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene, a polystyrene, a thermoplastic polyurethane, a poly(acrylonitrile-butadiene-styrene) (ABS), a polymethylmethacrylate, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Clause 28: The composite filament of clause 24, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

Clause 29: The composite filament of clause 24, wherein the piezoelectric particles are present in a sufficient amount to convey piezoelectric properties to a printed part, after poling.

Clause 30: The composite filament of claim 24, wherein the piezoelectric particles are present in a sufficient amount to convey at least one secondary property characteristic of piezoelectricity to the composite filament.

To facilitate a better understanding of the present disclosure, the following examples of preferred or representative embodiments are given. In no way should the following examples be read to limit, or to define, the scope of the invention.

EXAMPLES

Lead zirconate titanate (PZT, APC International, Ltd.) was sonicated using a Branson digital probe sonicator for 30 minutes in water at 25% amplitude to break up particle agglomerates. The original PZT agglomerate size of approximately 100 microns afforded PZT particles in a 1-5 micron size range following sonication.

Example 1: Formation of 1:1 (wt.:wt.) Polyamide:PZT Composite

Polyamide-12 was obtained from RTP Company and processed into a 1:1 polyamide (polyamide-12):PZT composite using a 600P Haake batch mixer. The temperature was set to 230° C. for all three plates, and the rotor speed was set to approximately 200 rpm when actuated. 30 g of polyamide (PA) pellets were added to the mixer at 230° C. while idle, and the polyamide was allowed to melt (~5 minutes). After melting occurred, the rotors were started, and PZT (30 g) was slowly fed into the mixer using a spatula. Once addition of the PZT was complete, the top of the mixer was closed off with its ram device, and mixing was continued with stirring for another 30 minutes. After 30 minutes, the rotors were stopped, and the resulting molten composite blend was discharged into an aluminum pie plate and cooled under ambient conditions. Once fully cooled and solidified, large chunks of the extrudate were crushed using an industrial press. Further reduction of the particle size was accomplished by cryo-milling the solidified extrudate with a small hand held IKA mill. The cryo-milling was conducted by immersing small portions of the solidified extrudate in liquid nitrogen for approximately one minute followed by approximately 15-20 seconds of milling.

Example 1A: Formation of 1:3 (wt.:wt.) Polyamide:PZT Composite

1:3 polyamide:PZT composite was prepared in the same manner as the 1:1 polyamide:PZT composite of Example 1, except 39 g of polyamide-12 and 117 g PZT were used.

Example 1B: Formation of 1:3 (wt.:wt.) Polycaprolactone:PZT Composite

Polycaprolactone was obtained from Happy Wire Dog, LLC and processed into a 1:3 polycaprolactone:PZT composite using a 600P Haake batch mixer. The temperature was originally set to 80° C. for all three plates, and the rotor speed was set to approximately 200 rpm when actuated. 30 g of polycaprolactone pellets were added to the mixer at 80° C. while idle. The temperature was then increased to ~250° C., and the polycaprolactone was allowed to melt (~5 minutes). After melting occurred, the rotors were started, and PZT (90 g) was slowly fed into the mixer using a spatula. Once addition of the PZT was complete, the top of the mixer was closed off with its ram device, and mixing was continued with stirring for another 30 minutes. After 30 minutes, the rotors were stopped, and the resulting molten composite blend was discharged into an aluminum pie plate and cooled under ambient conditions. Once fully cooled and solidified, large chunks of the extrudate were granulated using a 3devo Shred-it polymer shredder.

Example 1C: Formation of 1:1.8 (wt.:wt.) Polyvinylidene fluoride-co-hexafluoropropylene:PZT Composite Polyvinylidine fluoride copolymer with hexafluoropropylene (PVDF-co-HFP, KYNAR FLEX 2800-20, Arkema) was processed into a 1:1.8 PVDF:PZT composite using a 600P Haake batch mixer. The temperature was originally set to 230° C. for all three plates, and the rotor speed was set to approximately 200 rpm when actuated. 56 g of PVDF was added to the mixer at 230° C. while idle, and the polymer was allowed to melt (~5 minutes). After melting occurred, the rotors were started, and PZT (103.4 g) was slowly fed into the mixer using a spatula. The rotor speed was lowered gradually during addition of the PZT due to an increase in viscosity. Once addition of the PZT was complete, the top of the mixer was closed off with its ram device, and mixing was continued with stirring for another 30 minutes. The melt temperature increased to approximately 10° C. over the set temperature during the run. After 30 minutes, the rotors were stopped, and the resulting molten composite blend was discharged into an aluminum pie plate and cooled under ambient conditions. Once fully cooled and solidified, large chunks of the extrudate were granulated using a 3devo Shred-it polymer shredder.

Multiple batches of the composites prepared as above were combined to yield sufficient material for filament extrusion. Examples 1A-1C each contained about 30 vol. % PZT relative to the volume of the composite.

Example 1D:
Styrene-Ethylene-Butylene-Styrene:PZT Composites

Composites of PZT in styrene-ethylene-butylene-styrene block copolymer (SEBS, Kraton G1657) were prepared in the above Haake mixer to afford composites having PZT loadings of 30 vol. %, 40 vol. %, 50 vol. %, and 60 vol. % in SEBS (Examples 1D-a, 1D-b, 1D-c and 1D-d, respectively). Other than the PZT loading, similar procedures were used to prepare each composite in the following manner. SEBS polymer pellets were first added to the mixer, and allowed to mix and melt for approximately 2 minutes under the conditions specified in Table 1 below. Nitrogen purge was not used in these experiments, and the mixer feed port remained open. The PZT was then added slowly. Once all the PZT had been added, the materials were mixed for 15 minutes more, and then discharged into a steel pan and cooled under ambient conditions. Once cooled and solidified, the extrudate was pulverized in a shredder mill and placed in the vacuum oven to keep dry.

TABLE 1

| Sample ID | Mass of SEBS (g) | Mass of PZT (g) | Vol. % PZT | Initial Haake Set Temperature (° C.) | Measured Melt Temperature During Blending (° C.) | Yield of composite (g) |
|---|---|---|---|---|---|---|
| 1D-a | 18.0 | 230.0 | 60 | 240 | 255° C. | 236.0 |
| 1D-b | 22.5 | 191.7 | 50 | 235 | 248° C. | 199.5 |
| 1D-c | 27.0 | 153.4 | 40 | 230 | 244° C. | 171.7 |
| 1D-d | 31.5 | 115.0 | 30 | 227 | 239° C. | 132.5 |

Examples 2A-2D: Filament Extrusion

The composites prepared in Examples 1A-1D above were extruded using a Filabot EX6 filament extruder modified with a digital voltage readout to control the motor speed and extrusion rate. The Filabot EX6 filament extruder is capable of zonal temperature variation among the feed port nozzle, a back zone, a middle zone, and a front zone. The air path of the Filabot EX6 filament extruder may be further adjusted with respect to distance from the feed port nozzle or by raising the air path on a jack. In this example, the air path height was kept constant (2.5 cm below the exit nozzle port), and 100% airflow was used during extrusion. The air path distance was varied to afford a substantially constant filament diameter. Table 2 below summarizes the extrusion conditions and filament properties used when preparing composite filaments from the composites of Examples 1A-1D. Measurement of the filament diameter was conducted using an inline thickness gauge.

TABLE 2

| | Sample 2A | Sample 2B | Sample 2C | Sample 2D |
|---|---|---|---|---|
| Feed Material Source | Composite of Example 1A | Composite of Example 1B | Composite of Example 1C | Composite of Example 1D-a |
| Feed Temperature | 45° C. | 40° C. | 40° C. | 40° C. |
| Back Temperature | 175° C. | 80° C. | 170° C. | 215° C. |
| Middle Temperature | 175° C. | 80° C. | 170° C. | 215° C. |
| Front Temperature | 175° C. | 70° C. | 160° C. | 215° C. |
| Voltage | 5.0 V | 4.0-5.5 V | 4.0-5.5 V | 7.3 V |
| Nozzle size | 3.0 mm | 3.0 mm | 3.0 mm | 1.75 mm |
| Air flow | 100% | 100% | 100% | 100% |
| Winding speed | 1.0 rpm | 0.6-0.8 rpm | 0.9 rpm | n/a |
| Average filament diameter | 1.6 mm | 1.5 mm | 1.6-1.7 Mm | 1.6-1.7 mm |

Figure 3A:
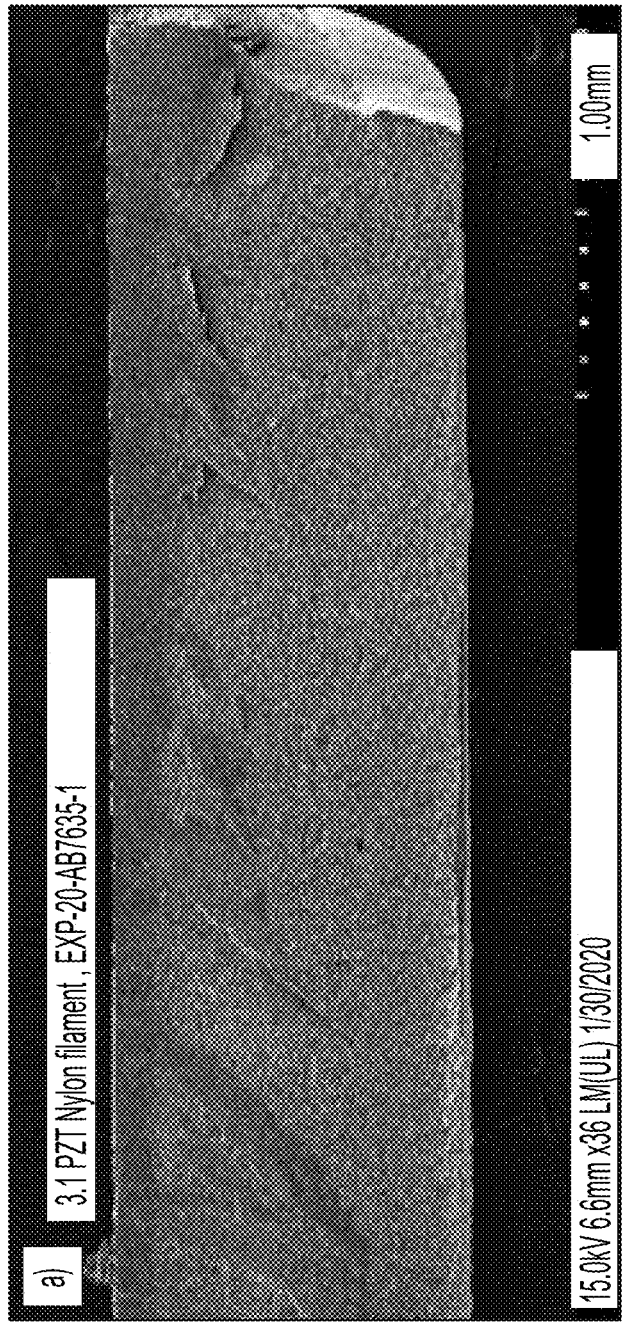
FIGS. 3A and 3B show illustrative SEM images of the composite filament of Sample 2A.
Figure 3B:
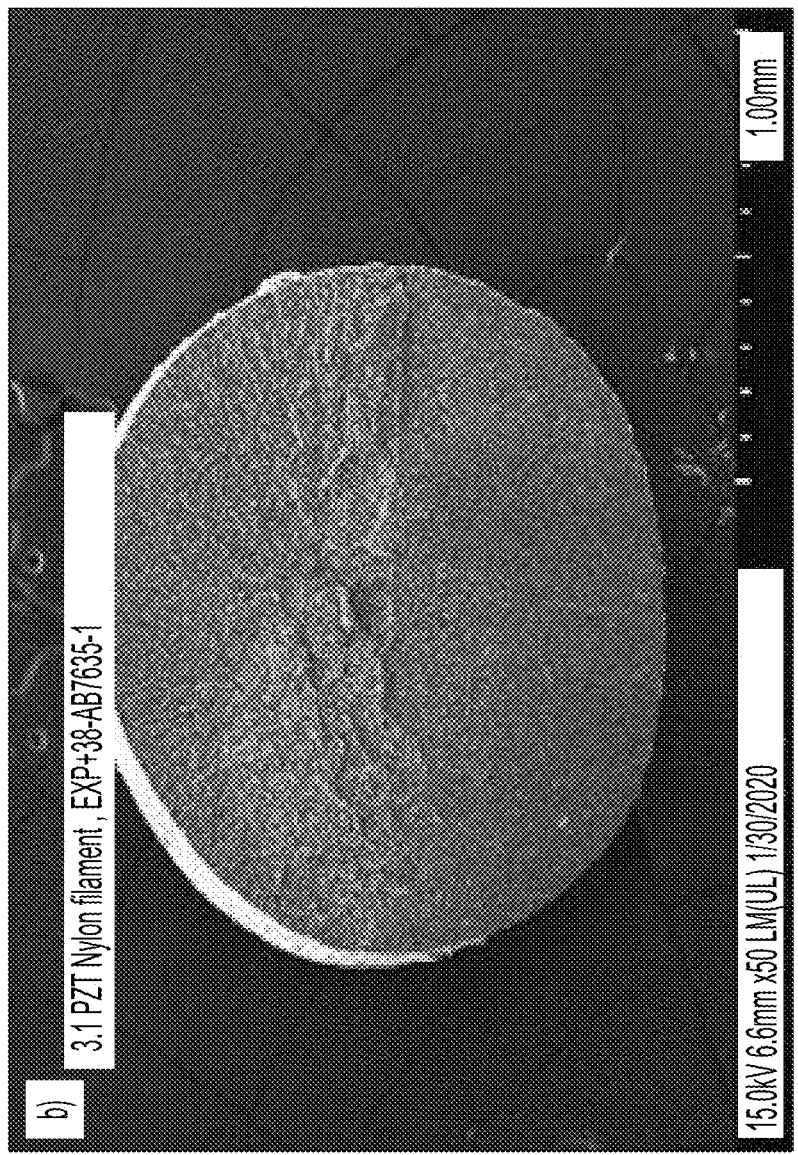
Figure 4A:
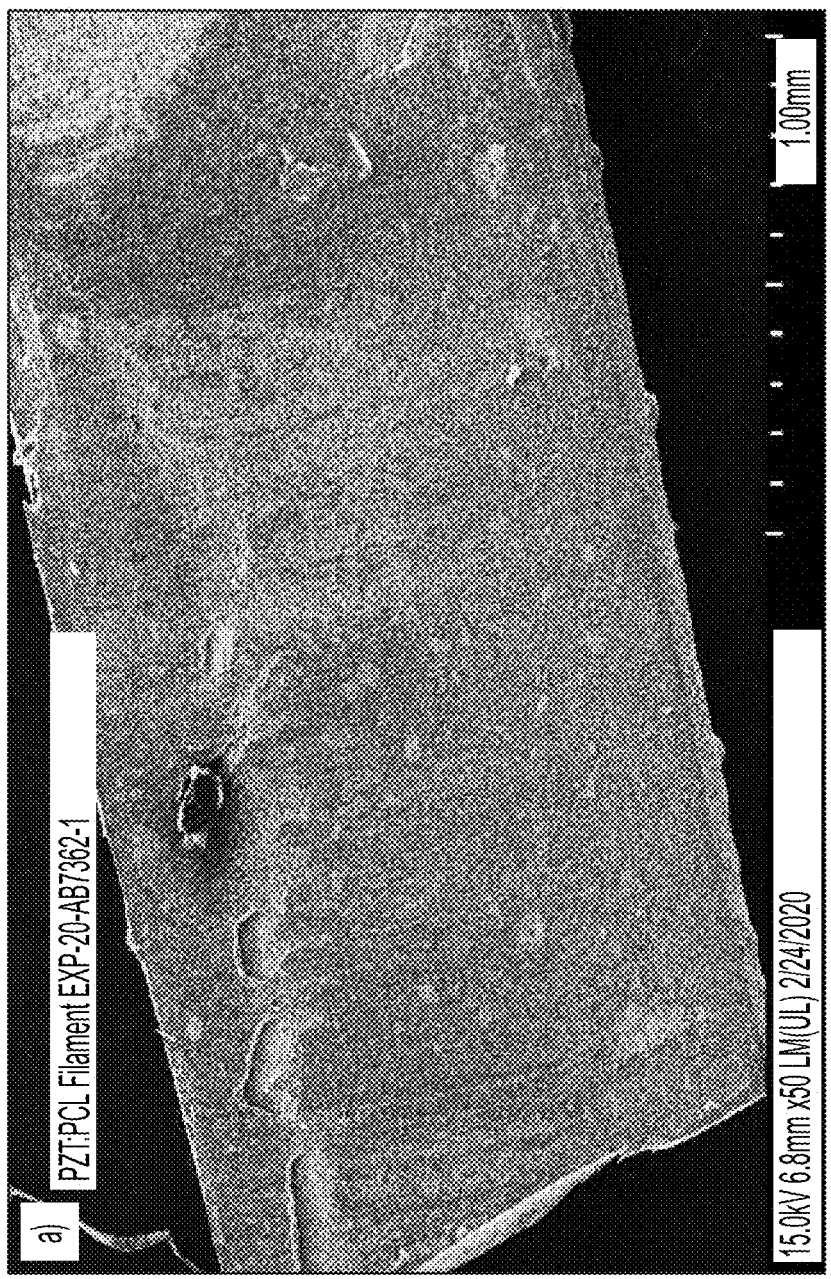
FIGS. 4A and 4B show illustrative SEM images of the composite filament of Sample 2B.
Figure 4B:
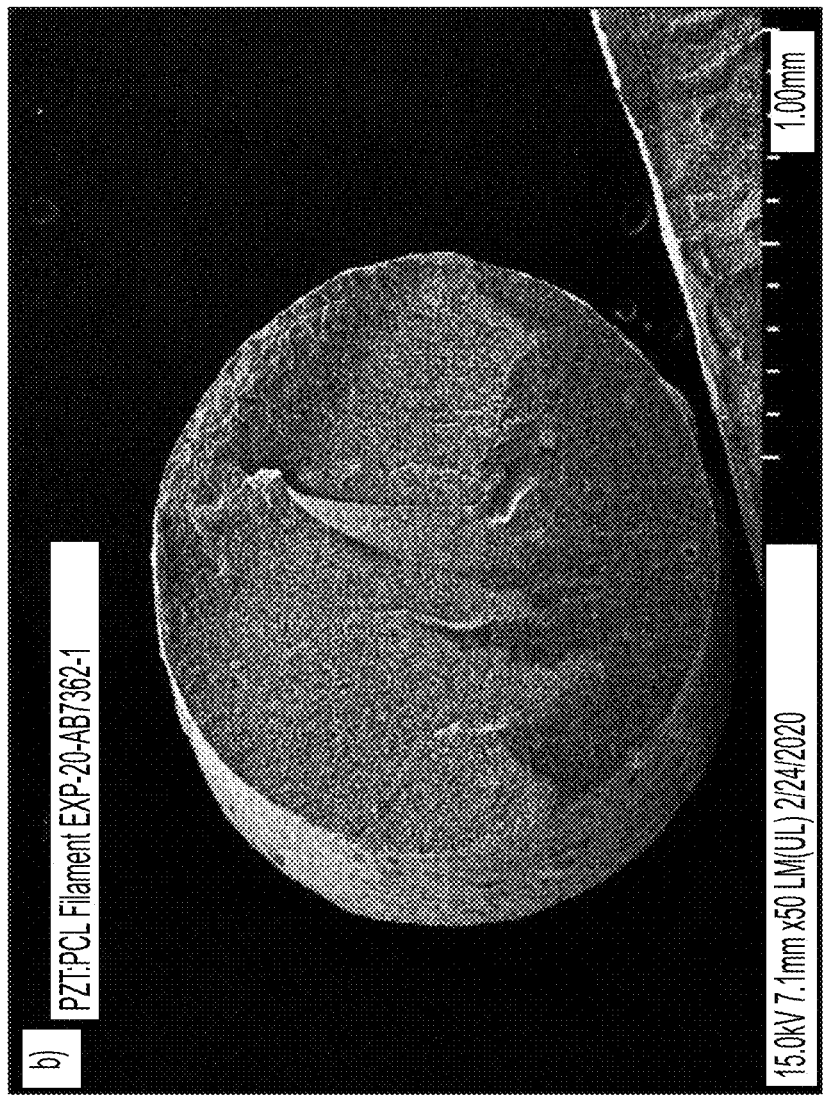

SEM images of the filaments of Sample 2A (FIGS. 3A and 3B) and Sample 2B (FIGS. 4A and 4B) indicated that the PZT was well dispersed within the polymer matrix, and the filaments were substantially void-free.

Example 3: Density Measurements

Density values for the composites (Examples 1A-1C) and the corresponding filaments (Examples 2A-2C) were determined using an AccuPyc 1330 gas pycnometer and compared to theoretical density values. Table 3 summarizes the density values.

TABLE 3

| | Theoretical Density (g/cm³) | Powder Density (Examples 1A-1C, g/cm³) | Filament Density (Examples 2A-2C, g/cm³ |
|---|---|---|---|
| Example 1A Composite or Example 2A Filament | 2.89 | 2.90 | 2.83 |
| Example 1B Composite or Example 2B Filament | 3.16 | 3.15 | 3.15 |
| Example 1C Composite or Example 2C Filament | 4.19 | not determined | 3.49 |

Examples 4: Printed Samples

The filaments prepared in Examples 2A and 2B above were printed using a Hyrel 30M 3-D printer under the conditions specified below in Table 4. Square parts were printed for further piezoelectric property testing (Example 5), and dog bone parts were printed for mechanical property testing (Example 6). Each layer in the printed parts was approximately 200 μm in thickness.

TABLE 4

|  | Sample 4A | Sample 4B |
|---|---|---|
| Feed Material Source | Filament of Example 2A | Filament of Example 2B |
| Speed of Print Head | 20 mm/s | 20 mm/s |
| Platen Temperature | 70° C. | 50° C. |
| Platen Material | Garolite | Garolite |
| Adhesion Promoter | Magigoo | Magigoo |
| Material Flow Rate Factor | 1.0-1.1 | 1.2-1.5 |
| Print Pattern | Rectilinear and concentric | Rectilinear and concentric |
| Chamber Heater Temperature | 60° C. | None |
| Printing Temperature | 203° C. | 70° C. |

Example 5: Piezoelectric Properties

Piezoelectric properties of 2 cm² square samples were evaluated by measuring $d_{33}$ values using an APC International Wide-Range $d_{33}$ meter. The $d_{33}$ meter is capable of measuring $d_{33}$ values between 1-2000 pC/N at an operating frequency of 110 Hz and an amplitude of 0.25 N. The $d_{33}$ value represents the quantity of charge generated when a piezoelectric material is subjected to a set applied force (amplitude). The samples tested were either printed samples (Samples 4A and 4B) or were formed through injection molding (comparative samples). Injection molded comparative samples were formed using a Minijector 45 and an aluminum mold. Additional experimental samples based upon the piezoelectric composites of Example 1D were formed by thermopressing. Further description of the samples and their piezoelectric properties are provided in Table 5 below. Prior to making the $d_{33}$ measurements, all samples were poled by a corona poling method in which the sample was exposed to a corona discharge for times ranging from 2 to 10 minutes. In the corona poling method, the sample was coated with silver paint on one side and exposed to a wire-generated corona. Since a surface area of approximately 300 μm² is exposed to the corona at a given time, the sample was moved to pole the complete surface through exposure to the corona. Variation in the poling process and routine sample-to-sample thickness inconsistencies may account for the variability in the $d_{33}$ values given in Table 5 below. Moreover, the poling process was not optimized.

TABLE 5

| Composite | Sample Type | Sample Thickness (μm) | Measured $d_{33}$ Values (pC/N) | Avg. $d_{33}$ Value (SD) (pC/N) |
|---|---|---|---|---|
| 1:3 Polyamide:PZT | Inj. Molded (comp.) | 1000 | 0.4, 0.5, 0.3 | 0.4 (±0.1) |
| 1:3 Polyamide:PZT | Inj. Molded (comp.) | 600 | 1.2, 2.1, 2 | 1.8 (±0.5) |
| 1:3 Polyamide:PZT | Printed (exp.) | 1000 | 1.1, 1.2, 1.6 | 1.3 (±0.35) |
| 1:3 Polyamide:PZT | Printed (exp.) | 1000 | 1.0, 0.7, 1.2 | 1.0 (±0.3) |
| 1:3 Polyamide:PZT | Printed (exp.) | 600 | 2.4, 1.9, 2.5, 2.1, 1.7 | 2.1 (±0.3) |
| 1:3 Polyamide:PZT | Printed (exp.) | 600 | 1.6, 1.6, 1.5, 1.7 | 1.6 (±0.1) |
| 1:3 Polyamide:PZT | Printed (exp.) | 200 | 5.1, 6.4, 5.8, 4.3 | 5.4 (±0.9) |
| 1:3 Polyamide:PZT | Printed (exp.) | 200 | 2.2, 2.8, 3.6, 6.2, 6.9 | 4.3 (±2.0) |
| 1:3 Polycaprolactone:PZT | Printed (exp.) | 600 | 9.5, 10.5, 9.2 | 9.7 (±0.7) |
| 1:3 Polycaprolactone:PZT | Printed (exp.) | 200 | 4.2, 4.5, 4.8, 3.8, 3.1 | 4.1 (±0.7) |
| 60 vol. % PZT:SEBS | Thermopressed (exp.) | 180 | 27, 16, 15, 22, 23 | 20.6 (±4.5) |
| 50 vol. % PZT:SEBS | Thermopressed (exp.) | 160 | 20, 17, 15, 23, 19 | 18.6 (±3.0) |
| 40 vol. % PZT:SEBS | Thermopressed (exp.) | 180 | 15, 17, 14, 15, 19 | 16 (±1.8) |
| 40 vol. % PZT:SEBS | Thermopressed (exp.) | 120 | 12, 9, 12, 16, 13 | 20.6 (±4.5) |

Although some variability was present, even among otherwise equivalent samples, a measurable piezoelectric response was obtained for each sample.

Example 6: Mechanical Properties

Mechanical properties of dog bone samples were evaluated using ASTM D638-14 Standard Test Method on an Instron 3367 instrument. Printed dog bone samples made using the composite filament of Example 2A were analyzed in comparison to printed dog bone samples prepared from the polyamide alone, injection molded samples prepared from the polyamide composite of Example 1B and the polyamide alone, and the composite filament of Example 2A and a comparative filament made from the polyamide alone. Testing results are summarized in Table 6 below.

TABLE 6

| | Printed Dog Bone | | Injection Molded Dog Bone | | Extruded Filament | |
|---|---|---|---|---|---|---|
| | 1:3 PA:PZT (Exp. Sample) | PA Only (Comp. Sample) | 1:3 PA:PZT (Comp. Sample) | PA Only (Comp. Sample) | 1:3 PA:PZT (Comp. Sample) | PA Only (Comp. Sample) |
| Young's Modulus (MPa) | 2480 | 1094 | 1260 | 630 | 1273 | 676 |
| Tensile Strength (MPa) | 48 | 38.6 | 46.5 | 43.9 | 38.9 | 29.9 |
| Elongation at Break (%) | 4 | 110.8 | 7.7 | >300 | 5 | 168 |

The Young's modulus of the composite was higher than the base polymer in each case, indicating increased stiffness in the composite. The Young's modulus of the samples was higher than that obtained by injection molding, which is believed to arise from the processing parameters of the printing process and the structure of the printed object itself.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:
1. A composite filament comprising:
    a plurality of piezoelectric particles dispersed in a thermoplastic polymer;
        wherein the thermoplastic polymer is non-piezoelectric and is selected from the group consisting of a polyamide, a polycaprolactone, a polystyrene, a poly (styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, any copolymer thereof, and any combination thereof; and wherein the composite filament is substantially free of voids, and is compatible with fused filament fabrication and has a length and diameter compatible with fused filament fabrication, and the piezoelectric particles are substantially non-agglomerated and dispersed along the length of the composite filament.

2. The composite filament of claim 1, wherein the piezoelectric particles are present in a sufficient amount such that the composite filament is capable of being printed as a single-layer thin film having a $d_{33}$ value, after poling, of about 1 pC/N or more at a film thickness of about 200 microns, as measured using an APC International Wide-Range $d_{33}$ meter.

3. The composite filament of claim 1, wherein the piezoelectric particles have an average particle size of about 10 microns or less.

4. The composite filament of claim 1, wherein the piezoelectric particles comprise about 10 vol. % to about 85 vol. % of the composite filament.

5. The composite filament of claim 1, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

6. The composite filament of claim 1, wherein the thermoplastic polymer is selected from the group consisting of a polyamide, a polycaprolactone, a poly(styrene-isoprene-styrene) (SIS), a poly(styrene-ethylene-butylene-styrene) (SEBS), a poly(styrene-butylene-styrene) (SBS), a polyester, any copolymer thereof, and any combination thereof.

7. The composite filament of claim 1, wherein the thermoplastic polymer is selected from the group consisting of a polyamide, a polycaprolactone, a poly(styrene-isoprene-styrene) (SIS), a poly(styrene-ethylene-butylene-styrene) (SEBS), a poly(styrene-butylene-styrene) (SBS), any copolymer thereof, and any combination thereof.

8. A process comprising:
forming a melt comprising a thermoplastic polymer and a plurality of piezoelectric particles;
wherein the thermoplastic polymer is non-piezoelectric and is selected from the group consisting of a polyamide, a polycaprolactone, a polystyrene, a poly(styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, any copolymer thereof, and any combination thereof;
blending the melt, optionally with stirring, to form a melt blend having the piezoelectric particles distributed therein; and
extruding the melt blend to form a composite filament comprising the plurality of piezoelectric particles dispersed in the thermoplastic polymer;
wherein the composite filament is substantially free of voids, and is compatible with fused filament fabrication and has a length and diameter compatible with fused filament fabrication, and the piezoelectric particles are substantially non-agglomerated and dispersed along the length of the composite filament; and
wherein forming, blending, and extruding occur sequentially or simultaneously.

9. The process of claim 8, wherein the piezoelectric particles are present in a sufficient amount such that the composite filament is capable of being printed as a single-layer thin film having a $d_{33}$ value, after poling, of about 1 pC/N or more at a single-layer film thickness of about 200 microns, as measured using an APC International Wide-Range $d_{33}$ meter.

10. The process of claim 8, wherein the piezoelectric particles have an average particle size of about 10 microns or less.

11. The process of claim 8, wherein the piezoelectric particles comprise about 10 vol. % to about 85 vol. % of the composite filament.

12. The process of claim 8, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

13. The method of claim 8, wherein the piezoelectric particles are processed by probe sonication before being combined with the thermoplastic polymer.

14. A process comprising:
providing a composite filament comprising a plurality of piezoelectric particles dispersed in a thermoplastic polymer;
wherein the thermoplastic polymer is non-piezoelectric and is selected from the group consisting of a polyamide, a polycaprolactone, a polystyrene, a poly(styrene-isoprene-styrene) (SIS), a poly(styrene-ethylene-butylene-styrene) (SEBS), a poly(styrene-butylene-styrene) (SBS), a high-impact polystyrene, a thermoplastic polyurethane, a poly(vinylpyrrolidine-vinylacetate), a polyester, polyethylene terephthalate, polyethylene naphthalate, a polycarbonate, a polyethersulfone, a polyoxymethylene, a polyether ether ketone, a polyetherimide, a polyethylene, a polyethylene oxide, a polyphenylene sulfide, a polypropylene, any copolymer thereof, and any combination thereof; and
wherein the composite filament is substantially free of voids, and is compatible with fused filament fabrication and has a length and diameter compatible with fused filament fabrication, and the piezoelectric particles are substantially non-agglomerated and are dispersed along the length of the composite filament;
heating the composite filament at or above a melting point or softening temperature thereof to form a softened composite material; and
depositing the softened composite material layer by layer to form a printed part; and
wherein heating and depositing occur sequentially or simultaneously.

15. The process of claim 14, wherein the piezoelectric particles are present in a sufficient amount such that the composite filament is capable of being printed as a single-layer thin film having a $d_{33}$ value, after poling, of about 1 pC/N or more at a film thickness of about 200 microns, as measured using an APC International Wide-Range $d_{33}$ meter.

16. The process of claim 14, wherein the piezoelectric particles have an average particle size of about 10 microns or less.

17. The process of claim 14, wherein the piezoelectric particles comprise about 10 vol. % to about 85 vol. % of the composite filament.

18. The process of claim 14, wherein the piezoelectric particles comprise a piezoelectric material selected from the group consisting of lead zirconate titanate, doped lead zirconate titanate, barium titanate, lead titanate, lead magnesium niobate, lead magnesium niobate-lead titanate, sodium potassium niobate, calcium copper titanate, bismuth sodium titanate, gallium phosphate, quartz, tourmaline and any combination thereof.

19. The process of claim 14, further comprising:
poling at least a portion of the printed part.

\* \* \* \* \*